(12) United States Patent
Hall

(10) Patent No.: US 9,552,224 B2
(45) Date of Patent: Jan. 24, 2017

(54) APPARATUS AND METHOD OF DATA CAPTURE

(71) Applicant: Sony Computer Entertainment Europe Limited, London (GB)

(72) Inventor: Simon John Hall, London (GB)

(73) Assignee: Sony Computer Entertainment Europe Limited (GB)

( * ) Notice: Subject to any disclaimer, the term of this patent is extended or adjusted under 35 U.S.C. 154(b) by 0 days.

(21) Appl. No.: 14/706,473

(22) Filed: May 7, 2015

(65) Prior Publication Data
US 2015/0324224 A1 Nov. 12, 2015

(30) Foreign Application Priority Data
May 12, 2014 (GB) .................................. 1408380.2

(51) Int. Cl.
*G06F 9/46* (2006.01)
*G06F 9/48* (2006.01)
*G06F 11/36* (2006.01)

(52) U.S. Cl.
CPC .............. *G06F 9/485* (2013.01); *G06F 9/4881* (2013.01); *G06F 11/3636* (2013.01)

(58) Field of Classification Search
None
See application file for complete search history.

(56) References Cited

U.S. PATENT DOCUMENTS

| 5,363,500 A * | 11/1994 | Takeda ...................... G06F 3/14 345/535 |
| 5,574,874 A * | 11/1996 | Jones ................... G06F 11/1407 711/100 |
| 7,302,613 B2 * | 11/2007 | Bliss .................... G06F 11/3476 714/37 |
| 7,529,897 B1 * | 5/2009 | Waldspurger ....... G06F 11/1438 711/161 |

(Continued)

OTHER PUBLICATIONS

Yang et al. "Reliable user-level rollback recovery implementation for multithreaded processes on windows"; Published online Oct. 24, 2006 in Wiley InterScience; (Yang_2006.pdf; pp. 331-346).*

(Continued)

*Primary Examiner* — Hiren Patel
(74) *Attorney, Agent, or Firm* — Lerner, David, Littenberg, Krumholz & Mentlik, LLP

(57) ABSTRACT

A method of capturing the state of a target program that is running within the environment of an operating system is provided. The method includes identifying threads associated with the target program, suspending threads associated with the target program, preserving data characterizing the threads, and preserving data accessible by the threads when in operation. A method of changing the state of a target program that is running within the environment of an operating system is also provided. This method includes identifying threads associated with the target program, suspending threads associated with the target program, replacing data characterizing the threads with previously preserved data, and replacing data accessible by the threads when in (Continued)

operation with previously preserved data. In either case, the threads are then resumed to allow the target program to continue operation.

9 Claims, 6 Drawing Sheets

(56) References Cited

U.S. PATENT DOCUMENTS

| | | | |
|---|---|---|---|
| 7,941,788 B2* | 5/2011 | Browning | G06F 11/3644 717/124 |
| 8,281,317 B1 | 10/2012 | Backensto et al. | |
| 8,495,589 B2* | 7/2013 | Bates | G06F 11/362 717/124 |
| 8,549,537 B2* | 10/2013 | Hu | G06F 8/00 719/312 |
| 8,745,442 B1* | 6/2014 | Havemose | G06F 11/1438 714/13 |
| 8,752,048 B1* | 6/2014 | Backensto | G06F 11/1479 714/13 |
| 8,752,049 B1* | 6/2014 | Backensto | G06F 11/1479 714/13 |
| 8,806,449 B2* | 8/2014 | Bates | G06F 11/362 717/124 |
| 9,354,977 B1* | 5/2016 | Backensto | G06F 11/1448 |
| 2001/0054057 A1 | 12/2001 | Long et al. | |
| 2002/0059470 A1* | 5/2002 | Allard | G06F 9/548 719/315 |
| 2002/0194525 A1 | 12/2002 | Mathiske et al. | |
| 2003/0033344 A1 | 2/2003 | Abbott et al. | |
| 2004/0098639 A1* | 5/2004 | Liu | G06F 11/3664 714/35 |
| 2004/0139440 A1* | 7/2004 | Browning | G06F 9/524 718/107 |
| 2005/0198647 A1 | 9/2005 | Hipp et al. | |
| 2005/0246718 A1* | 11/2005 | Erlingsson | G06F 9/4411 719/317 |
| 2006/0085679 A1* | 4/2006 | Neary | G06F 11/1438 714/13 |
| 2007/0294578 A1* | 12/2007 | Qiao | G06F 11/203 714/17 |
| 2008/0270988 A1 | 10/2008 | Li et al. | |
| 2009/0183027 A1 | 7/2009 | Subhraveti | |
| 2010/0082816 A1* | 4/2010 | Kharat | G06F 9/54 709/226 |
| 2012/0079459 A1* | 3/2012 | Bates | G06F 11/3636 717/129 |
| 2012/0179673 A1* | 7/2012 | Kelly | G06F 17/30528 707/731 |
| 2012/0239850 A1* | 9/2012 | Qiu | G06F 12/10 711/6 |
| 2013/0067186 A1* | 3/2013 | Pronovost | G06F 12/02 711/170 |

OTHER PUBLICATIONS

Ryan S Wallach Lucent Technologies: "Gemini Lite: A Non-intrusive Debugger for Windows NT", USENIX, Jan. 30, 2002 (Jan. 30, 2002), pp. 1-10, XP061011426, [retrieved on Jan. 30, 2002] * paragraph [0001]—paragraph [04.5] *.

Eddy Truyen et al: "Portable Support for Transparent Thread Migration in Java", Feb. 3, 2004 (Feb. 3, 2004), Agent Systems, Mobile Agents, and Applications; [Lecture Notes in Computer Science;;LNCS], Springer-Verlag. Berlin/Heidelberg, pp. 29-43, XP019001066, ISBN: 978-3-540-41052-2 * paragraph [0001]—paragraph [03.3] *.

European Search Report for Application No. 15164914.2 dated Oct. 16, 2015.

Great Britain Combined Search and Examination Report for Application No. GB1408380 dated Mar. 3, 2015.

* cited by examiner

APPARATUS AND METHOD OF DATA CAPTURE

CROSS REFERENCE TO RELATED APPLICATIONS

The present application claims the benefit of and priority to GB Application No. 1408380.2, filed May 12, 2014, the entire disclosure of which is incorporated by reference herein.

BACKGROUND OF THE INVENTION

Field of the Invention

The present invention relates to an apparatus and method of data capture.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Conventional methods exist to archive the complete state of a computer system. An early example of such a method was the hardware based transfer of the complete memory of a computer to a file. An example of this approach is the SNA snapshot format, used for 8 bit computers such as the Sinclair Spectrum® and Amstrad CPC®. The hardware-based duplication of the entire memory from such old machines is typically used to transfer their functionality to an emulated version of the machine on a modern computer.

A more recent example of this approach is the ability to run a virtual PC on a server. Again a snapshot of the state of such a virtual system can be taken by copying the system memory of the virtual machine to permanent storage. The virtual machine can then be shut down, and resumed when needed using the stored system memory.

This in turn is essentially a virtualised implementation of the hibernation mode used for example by laptops running Microsoft Windows®, in which all current system memory is copied to the laptop hard disk and the laptop then shuts down. Upon being restarted, the system memory is restored back from the hard disk so that the computer can resume from its previous state.

In each case, the entire memory of the system is captured, thereby including the states of the operating system (OS) and any applications running in the OS environment, for the purposes of suspending the whole machine for an indefinite period before restoring it from scratch following a real or virtual power-on action.

However, there are circumstances in which, rather than suspending the state of the whole system, and restoring the whole system, it would be preferable to copy a state without interrupting the system, so that the OS and applications can continue to operate but it would be possible to restore the copied state later on.

Microsoft Windows® provides the facility to set so-called restore points, which are archives of the settings and software for certain key functions of Windows®. Restore points are typically created before new software is installed that directly interacts with the Windows® system and/or host hardware, such as driver software and other system files. This allows the new software installation to be undone by restoring the previous software and its settings in Windows® if there is a problem with the new software.

However, it will be appreciated that while restore points allow for old programs to be recovered and re-integrated into the operating system, they are not intended to save the current running state of a program currently running on the OS.

Nevertheless, there are circumstances in which it would be desirable to be able to save the current running state of a computer program for subsequent recovery, such as when developing new software that may crash or behave unexpectedly.

The present invention aims to mitigate this problem.

SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

In a first aspect, a method of capturing the state of a target program that is running within the environment of an OS is provided.

In another aspect, a method of changing the state of a target program that is running within the environment of an OS is provided.

In another aspect, a computing apparatus for capturing the state of a target program that is running within the environment of an OS is provided.

In another aspect, a computing apparatus for changing the state of a target program that is running within the environment of an OS is provided.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
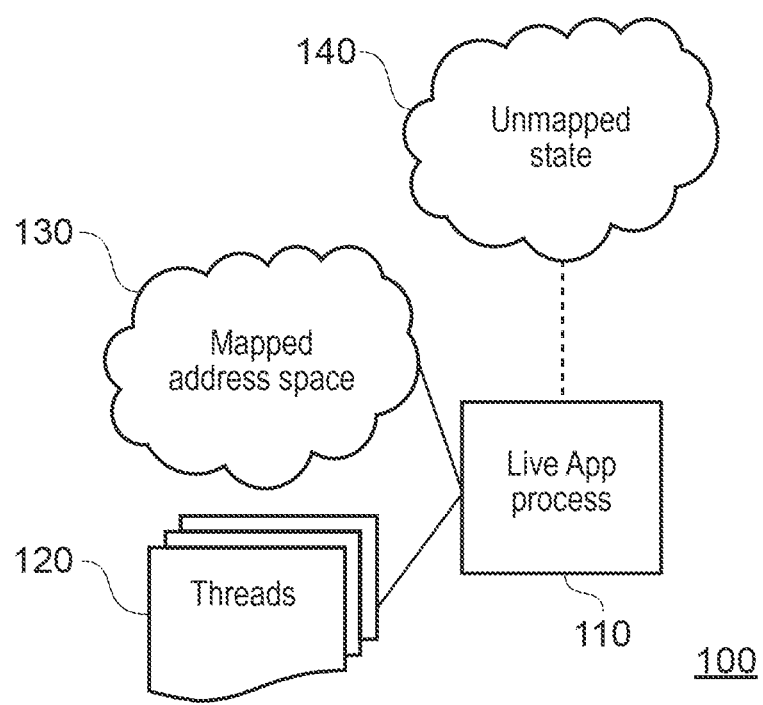
FIG. 1 is a schematic diagram of a running program.

Referring now to the drawings, wherein like reference numerals designate identical or corresponding parts throughout the several views, an apparatus and method of data capture are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Overview of Computer Program

Referring to FIG. 1, a typical computer program 100 is illustrated. Such a computer program runs within the environment provided by the host operating system. Typical host operating systems include various iterations of Windows® and Linux®, and also operating systems such as Cell OS, which runs on the PlayStation 3®, and Orbis OS, which runs on the Playstation 4®. Other operating systems will also be known to the skilled person.

The computer program 100 comprises a process (live app process 110) that owns one or more threads 120. The process also has a virtual memory allocated to it by the operating system that it can use to store any data, workings and results it needs, in the form of a mapped address space 130. It is also possible that during the live running of a program the program affects the memory of the host computer in other areas that are not directly mapped to the process, such as in a graphics co-processor and its attendant video RAM. This is termed 'unmapped state' information 140.

It is desirable to capture sufficient information about the process, the threads, the mapped space and unmapped state of the live running program to enable the program to be subsequently 'rewound' back to that live running state, whilst also allowing the program to continue operation after the capture process has occurred.

Hence it is desirable to provide a capture feature that can capture the state of a running program; the program can then subsequently continue to run, but at a user's discretion a 'rewind' feature can substitute the existing state of the computer program with the captured state, so that in effect the program 'rewinds' to a previous time of operation.

Notably, this occurs without suspending or archiving the underlying operating system and/or the machine as a whole, as in the above described prior art.

Also notably, the facility preferably works without the need to modify the source code of the running program first, so that the rewind function can work with any (or at least with many) third party programs running within the OS environment, thus providing in operation a new, general 'rewind' function of the OS and by extension of the computer.

Such a facility would be of particular use to program developers who may wish to evaluate the behaviours of a program in response to different variables, such as variations in user inputs, or other factors. By capturing the state of a program at a given point, the program can be replayed differently from a common start position to evaluate its behaviour in different circumstances, either to assess faults in the program or to assess and adjust a user experience.

Overview of Capture Process

Figure 2:
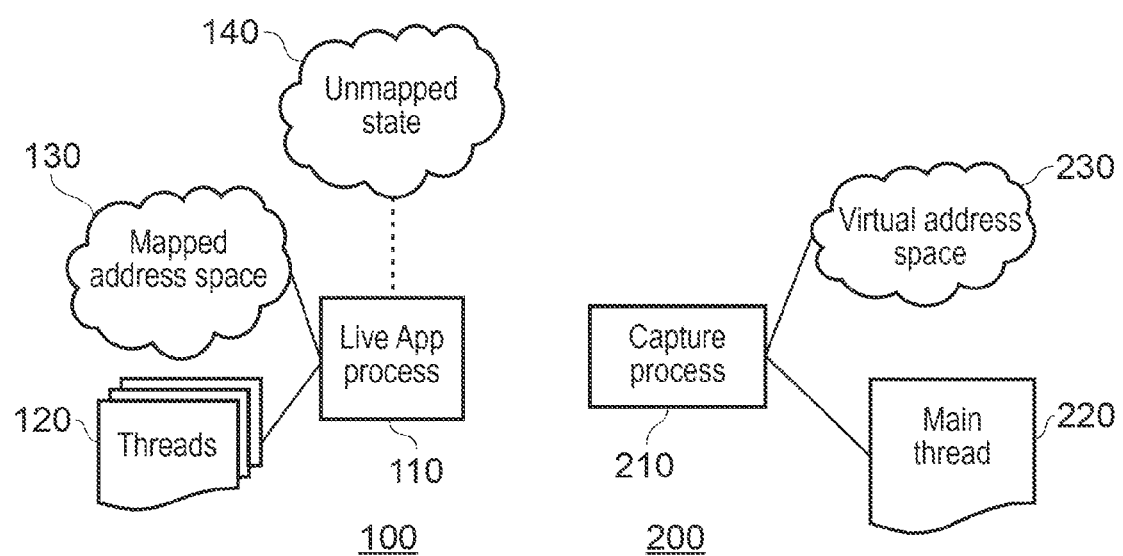
FIG. 2 is a schematic diagram of the running program as a target process together with a capture process, in accordance with an embodiment of the present invention.

Referring now also to FIG. 2, in an embodiment of the present invention a second computer program 200 is run within the environment of the operating system. This second computer program (hereafter the capture program) comprises a capture process 210 that owns one or more threads (e.g. main thread 220). The capture process also has virtual address space 230 allocated to it by the OS.

Hence the OS runs (among any other processes that it is running) two processes; the first process of computer program 100—which may be referred to as the target process 110—and the second process of the capture program 200—which may be referred to as the capture process 210.

Operation of the Capture Process

The following description assumes throughout that Windows® is the host operating system (OS) for consistency of explanation, but it will be appreciated that any suitable OS may be used.

The capture process may support a user interface, allowing a capture event to be initiated by a user of the system. Alternatively or in addition, it may perform a capture event periodically. Alternatively or in addition, it may perform a capture event in response to a change in the operating system environment, such as a particular disc access, or memory or processor utilisation reaching a predetermined threshold.

When a capture is to be performed, the capture process obtains the target process ID and requests from Windows® a list of all threads in the system. The capture process can then compare the thread owner ID with the target process ID to identify the threads owned by the target process. It will be appreciated that in an OS where it is possible to request a list of threads corresponding to a process ID, this initial step can be simplified.

Once the capture process has a list of threads belonging to the target process, the capture process can attempt to suspend each thread on the list at a time. How this is done may depend on the OS and/or the permission level of the capture process; examples include direct instruction by the capture process or a request to the OS. Once a thread is suspended it cannot resume by itself unless an external process requests it. An OS will also not spontaneously resume a suspended thread of a third party process.

Figure 3:
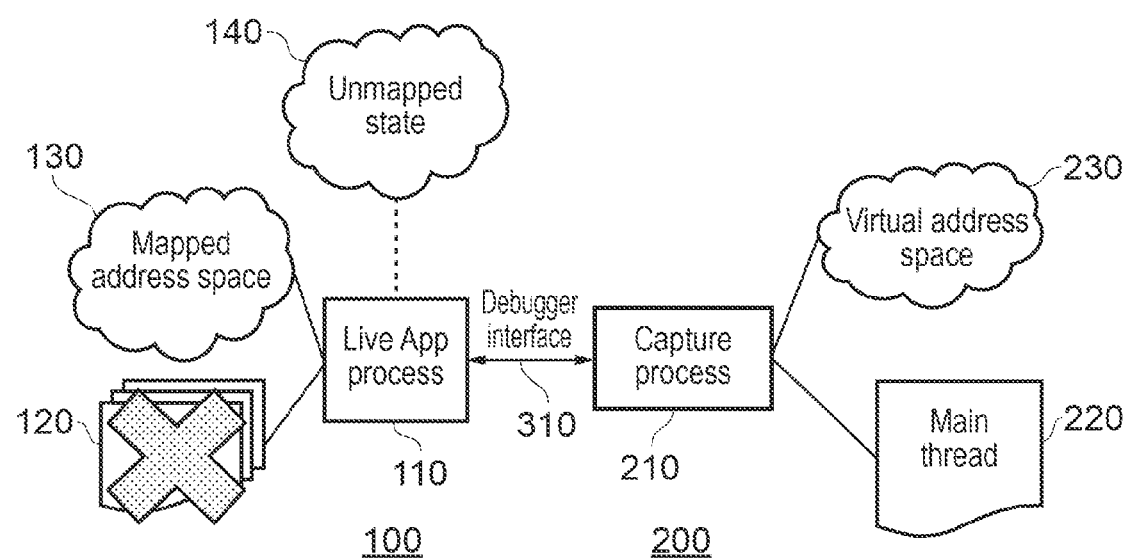
FIG. 3 is a schematic diagram of a suspended target process together with a capture process, in accordance with an embodiment of the present invention.

As illustrated in FIG. 3, as a result the threads of the target process can all be suspended in quick succession. However, any hardware, services or code outside the user mode environment of the target process will not be suspended by this process; for example, if a graphics command was sent to the GPU the instant before the threads of the target process were suspended, then the GPU will continue to process this command.

The suspension requests can be issued one after the other without waiting for each suspension to complete, and hence the suspensions can occur substantially in parallel. However, where it is possible to monitor the memory use and/or CPU utilisation of each thread in advance, then optionally the thread requests can be issued in order of largest and/or most CPU intensive threads first to last. This is most likely to result in the target process' main thread being suspended first, thereby limiting scope for the main thread to attempt to communicate with a suspended thread during the brief period in which threads are being suspended.

Kernel and User Modes

When a thread is suspended, it can either stop in user mode or kernel mode.

User mode is a non-privileged mode that normal code runs in. When a thread stops in user mode, it is possible for example to read its registers (including single instruction, multiple data registers), program counter and condition flags.

By contrast, kernel mode is a privileged mode that the OS code runs in. Threads of target process enter this mode when they request an operation from the OS, such as reading the keyboard. Hence for example, a thread in user mode that makes a system call will swap the processor into kernel mode; once the relevant function is complete, then it swaps back to user mode. However if the thread is in kernel mode when it is suspended, then the capture process cannot properly inspect the thread; all that is visible is the program counter of the system call instruction and undefined registers and flags. Hence it is impossible to capture (or reconstruct) the state of the thread when suspended in kernel mode.

Consequently, once the capture process has suspended the treads of the target process, some will stop in user mode and some in kernel mode. The capture process can readily store the registers, program counter and flags of threads in user mode. However for threads in kernel mode, a different approach is needed.

Access to Threads Suspended in Kernel Mode

To a first approximation, one can assume that a thread in kernel mode will exit that mode and return to user mode if it was resumed for a short period of time; in other words, if the relevant system call that caused the thread to enter kernel mode was allowed to complete its current operation.

However, if the thread is allowed to resume, it would be desirable to re-suspend the thread as soon as it re-entered user mode. Depending on the OS, the status of the thread may be directly inspected by the capture process (or by the OS, which the capture process can interrogate), enabling the thread to be suspended when its status changes from kernel mode to user mode. However, where this is not possible then an alternative approach may be considered as follows:

Using Windows® as an example, the Windows® debugging API ('debugger interface') 310 can be used to present the capture process as a debugger to the target process, allowing it to be attached prior to the capture event commencing. When a capture is performed, the capture process can then replace the instruction immediately following the system call instruction with a breakpoint instruction. The capture process can then resume the suspended thread and wait for the breakpoint event. The thread then runs until it exits kernel mode, hits the breakpoint and is re-suspended, but now in user mode. The capture process re-inserts the replaced instruction and then stores the state of the thread like any other thread in user mode, as described previously. This process can be repeated for each thread that is suspended in kernel mode, if necessary.

The above process is further complicated however, by the fact that it is not correct to assume that all threads in kernel mode will exit that mode in a short period of time. Some threads remain in kernel mode indefinitely, such as those waiting for a semaphore or mutex (mutually exclusive semaphores), or reading network traffic. Thus more generally, any call that may cause a thread to sleep or 'block' in kernel mode indefinitely needs to be dealt with.

In an embodiment of the present invention, such calls are trapped and replaced with a modified call that is embedded in a while loop.

In order to achieve this without needing code of the target program to be written specifically to co-operate with the capture process, it is useful to appreciate that such kernel mode calls are to functions external to the target program.

Hence for example consider a function from Windows® kernel32.dll called WaitForSingleObjectEx. This function can block in kernel mode indefinitely. However, the capture process can replace this dll (dynamic link library) function by updating the function pointer table in the dll to point to a substitute function MyWaitForSingleObjectEx—

```
DWORD WINAPI MyWaitForSingleObjectEx(
    _In_ HANDLE hHandle,
    _In_ DWORD dwMilliseconds,
    _In_ BOOL bAlertable
)
{
```

-continued

```
    if (dwMilliseconds == INFINITE)
    {
        DWORD ret;
        while ((ret = WaitForSingleObjectEx(hHandle, 100,
bAlertable)) == WAIT_TIMEOUT);
        return ret;
    }
    else
        return WaitForSingleObjectEx(hHandle, dwMilliseconds,
        bAlertable);
}
```

It will be appreciated that this replacement function calls the original WaitForSingleObjectEx function transparently unless it has an infinite allowed run period, in which case it is replaced with a call having a maximum 100 milliseconds block that sits within a user-mode while loop. It will be appreciated that the test for an infinite period could be replaced with any suitable threshold (such as, for example, greater than 200 or 100 milliseconds). As the while loop itself exists in user mode, the overall effect is function operation within the kernel mode, but with regular brief returns to user mode.

Wrappers to substitute other potentially indefinitely running functions in the system dlls used by $3^{rd}$ party programs then all follow this approach.

In this way, the previously described approach for accessing threads suspended in kernel mode can be used, as it makes correct the assumption that threads in kernel mode will exit within a brief period of time.

Hence as a preparatory step the capture process (or indeed a companion process to the capture process) supplies substitute system functions to the target process, at least for those functions capable of indefinite blocking in kernel mode. When a capture takes place, the capture process suspends all threads of the target process, and either directly stores the state of those threads suspended in user mode, or adds a breakpoint and temporarily releases threads in kernel mode until they re-enter user mode, at which point they are suspend and read like any other suspended thread in user mode. The substitute system functions described above ensure that a return to user mode will happen in every thread.

In this way, the capture process can capture a complete state of all threads of the target process.

In addition however, the capture process also captures the virtual memory system of the target process.

Virtual Memory of Target Process

The capture process, either by direct inspection (if adequate privileges are available), or via the OS, or via a debug interface, inspects each virtual memory area (VMA) in the target process' virtual memory space, starting at address zero.

A VMA is defined by a starting address and a size, and typically also by a protection parameter and a flag indicating the physical form of the memory. The protection parameter defines the operations that the target process is allowed to perform within the memory, such as read only, read/write, execute only, etc. The flag indicates whether the VMA actually has physical memory allocated to it, as it could simply be a reserved area of virtual space that has no real memory allocated—in which case an access attempt will typically call a trap handler.

For each VMA in the target process, the capture process creates a new VMA of its own of the same size, and sets it as read/write, no execute. The VMA memory from the target process is then copied to the new VMA of the capture process. The actual protection parameter of the target VMA is stored in association with the new VMA elsewhere by the capture process.

Threads can have dedicated VMAs for storing per-thread data. Such VMAs are typically referenced by a table stored in the VMA of an owning process and hence can also be accessed and duplicated in the same way.

In this way, all user-visible memory of the target process and its threads can be copied to one or more VMAs of the capture process.

Capturing Indirectly Accessible State Information

The capture process can capture mutexes and semaphores by enumerating all the synchronisation objects in the system and correlating these with the target process ID. The value of an object can also be read. The functions to do this may be included in the capture process or may be part of the OS.

Other relevant data may be captured in a similar manner if required, such as file handles.

For applications that have a significant audio/video component, such as games, it would also be beneficial to capture the state of the GPU and local VRAM. This is because when the stored state of the target process is subsequently restored, it will assume that any current texture and geometry data in VRAM is still present.

For some devices such as the PlayStation 4®, which has a unified memory architecture, this is relatively straightforward and the techniques above can be employed, optionally in conjunction with some techniques described herein below.

For a Windows® PC and similar architectures and/or operating systems one may expect to encounter a discreet video card (such as an NVidia® or AMD® video card) and a graphics interface such as Direct3D.

Direct3D supplies resources such as buffers, textures, render targets etc., via a handle system; hence for example if the target process requested a new texture, Direct3D may set the texture up and return a texture ID such as '1234'. However, the video card itself will use an internal representation of its real resources, and a mapping between the Direct3D issued ID and the actual texture will be stored somewhere that is not directly accessible by the capture process.

However, Direct3D presents itself as a single function call from the Direct3D dll. Hence it is possible to supply a modified function (hereafter a 'D3D Wrapper') to the target process that routes function calls though to Direct3D whilst logging all these function calls and their arguments for the benefit of the capture process.

The Direct3D function call gives a C++ virtual interface for a tree of classes. Hence the D3D Wrapper returns a modified tree of classes and associated virtual function calls to replacement functions from which ID/handle and resource redirection can be monitored.

Hence it will be appreciated that Direct3D function calls can be replaced in a similar manner to the replacement function calls to system dlls discussed previously, enabling routing of the calls to the real Direct3D whilst also monitoring and logging salient data.

When a capture is instigated, the capture process (and/or the modified function) walks through each logged function call and requests from Direct3D (either directly or via the D3D Wrapper) that the corresponding resource is copied from VRAM to a new user-visible VMA of the target process. Once each resource has been copied in this fashion, Direct3D is instructed (again either directly or via the D3D Wrapper) to shut down.

Typically this transfer and shut down of video assets and Direct3D occurs either just prior to or in parallel with the suspension of the threads in the target process. This limits the scope for unmonitored processes to be implemented by the GPU during the suspended period.

The new VMA containing the VRAM is copied to a VMA of the capture process in a similar manner to other VMAs of the target process.

In this manner, the capture process acquires the resources in the VRAM in association with their logged Direct3D handles.

It will be appreciated that a similar approach can be used for other graphics APIs such as OpenGL; indeed, in the case of OpenGL it may optionally be adapted to provide these monitoring and logging functions natively.

Moreover, this approach may be used for any API interfacing with a relevant but not directly accessible state, such as an API for sound, with attendant sound RAM, OpenCL memory buffers, any suitable interface to discreet or unified video RAM and indeed to memory holding mutex and semaphore states.

Figure 4:
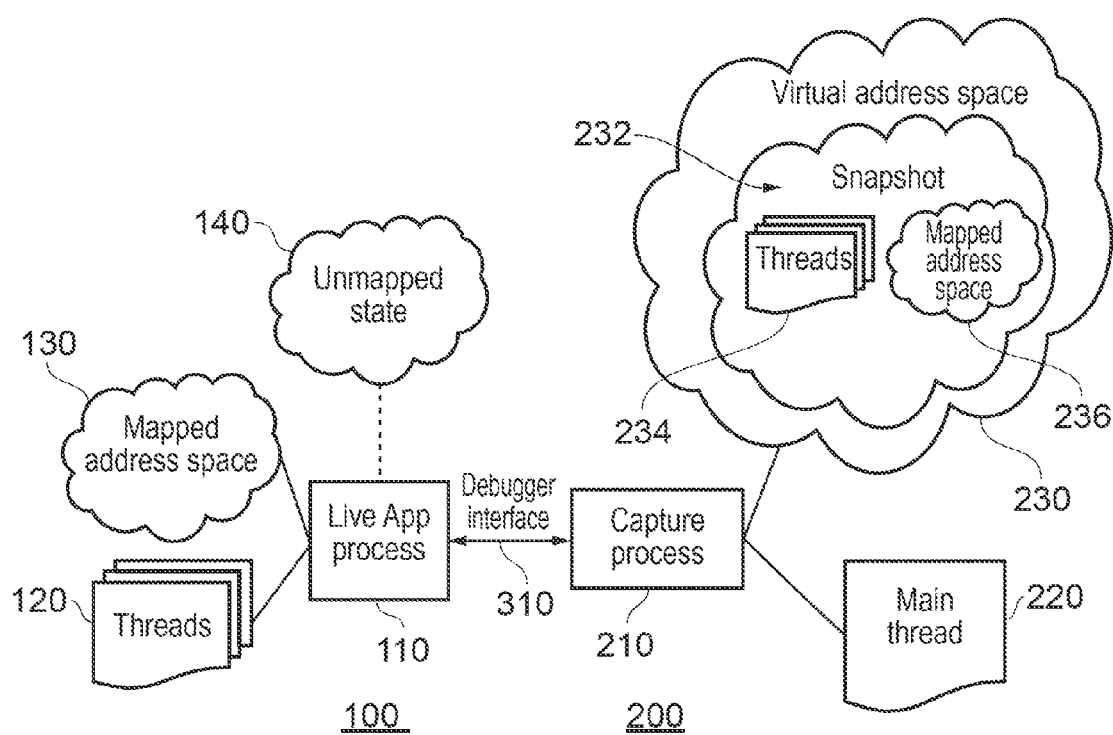
FIG. 4 is a schematic diagram of a resumed target process together with a capture process holding a snapshot of the suspended target process, in accordance with an embodiment of the present invention.

Referring now to FIG. 4, using the above techniques it is possible to suspend and back-up the data needed to characterise the current running state of a target process, without any prior modification to that target process. In particular, the thread data, mapped memory and VRAM resources of a target process can be copied to a visible address space of a capture process. The result is a snapshot 232 comprising thread data 234 and mapped address space 236, including VRAM data copied to the memory of the target process and then on to the memory of the capture process, as described previously. The saved information may then be stored separately, for example on a hard drive or network storage, and/or may be retained in the memory of the capture process.

As such the above techniques provide a computer with the generalised means to snapshot the state of a running and unmodified program without interrupting the overall operation of the wider OS or other programs. The target process can then be released to resume its current operations, and subsequently can be 'rewound' to the stored state, as described herein below.

Releasing the Target Process

To get the target process running again after a capture has taken place, the capture process arranges for the suspended threads of the target process to be released again, optionally in the same order in which they were suspended. In addition the capture process or the D3D Wrapper instructs Direct3D to restart, and transfers back all the VRAM resources from the VMA. Direct3D will assign new IDs to these resources, and so the D3D Wrapper builds a lookup table between the old and new IDs so that it can translate between them when communicating with the target process (which will still have the old IDs) and Direct3D (which will use the new IDs). Optionally suspended threads are released once Direct3D has restarted and the VRAM has been restored.

The target process is then able to resume, with the D3D Wrapper maintaining communication with the new instance of Direct3D and continuing to translate resource IDs.

Operation of the Rewind Process

The rewind process implemented at a later time. The rewind process typically assumes that the target process is currently running; indeed, typically it will be the same instance of the target process from which the state was previously captured.

Many steps in the rewind technique are common to the capture technique, and typically the capture process is also capable of implementing the rewind technique. However optionally a separate rewind process may be run for this purpose, or a separate process may be used for supplementary steps of the technique. Hence hereafter where a 'rewind process' is referred to, it will be understood that this may refer to either the capture process or a separate rewind process implementing the rewind technique.

The first steps of the rewind process are similar to those of the capture process; namely, identifying and suspending the target process' threads, and getting them into user mode where needed. Direct 3D is also shut down. The methods for doing these have been described previously herein and are not repeated.

For each thread stored within the snapshot 232, the rewind process copies the register/program counter/flags etc into the corresponding thread of the target process.

Similarly, for each of the virtual memory areas in the snapshot 232, the rewind process copies the contents into the corresponding VMA of the target process. If a VMA is now different, then it can be deleted and a new one is requested with the desired permissions, size etc., and then the contents from the stored snapshot are copied across as appropriate.

For saved semaphores and mutexes, the rewind process can place these in the global system object pool and then lock, signal and/or release them until their internal values match what they did at capture.

The rewind process then repeats the release technique described previously to release the threads of the target process and re-start Direct 3D with VRAM resources copied from the relevant snapshot VMA. Again the D3D Wrapper is used to maintain communication with the new instance of Direct3D.

In this way, the target process is 'rewound' back to the time that the snapshot was taken, without interrupting overall operation of the operating system or other applications, whilst allowing the target process to resume after the snapshot was taken, and also without the requirement to modify the code of the target process in advance.

Threads

It was noted above that for each thread stored within the snapshot 232, the rewind process copies the register/program counter/flags etc., into the corresponding thread of the target process. However, it is possible that a particular thread may have been terminated in the time since the capture took place.

The rewind process can request the creation of a new thread for the target process, but the new thread will have a different thread ID, and this is typically read-only.

Consequently, in an embodiment of the present invention the capture process also traps all thread create/destroy operations and instead replaces them with a persistent thread pool. All threads are allocated from a large pool, and when a destroy operation is trapped, the thread is simply returned to the pool. Consequently the rewind process can then still access all the threads with correct IDs of the target process as it was when its state was captured.

Memory Management

It will be appreciated that the snapshot process can potentially use significant amounts of memory if one allocates a new VMA in the capture process that is the same size as that in the target process, backing it up with physical memory and then copying each byte from the target process to the capture process. Consequently, in an embodiment of the present invention, a memory-efficient approach is not to allocate a new VMA in the capture process in this manner, but instead create a new VMA in the capture process that has the same properties as that of the target process, but inform the OS that both VMAs point to the same piece of physical memory. The OS is then also informed that this physical memory is to be treated as 'copy on write', thereby preserving any data that is overwritten by subsequent operation of the target process. Typically in this case, when the target process writes to a memory page the VMA, the OS momentarily pauses the target process, allocates a new physical memory page and copies the current content of the page to the new page, maps that copied page within the VMA of B and then resumes A. In this way the operating system manages copying and only physically copies those memory contents that would be altered while the resumed target process runs. This significantly speeds up the snapshot process and also significantly reduces the size of the snapshot in memory.

Uses

A likely scenario for use of the capture/rewind technique is for an application whose current state is the result of significant input, either by a user or real-world data, and so is difficult or laborious to replicate, but where it is anticipated that subsequent inputs or program operations could either diverge significantly or cause errors, in which case it is desirable to create the snapshot before this occurs so that labour is saved when reviewing these outcomes.

Examples of such applications are videogames, where the state of the game environment may be responsive to the player's actions, and also possibly responsive to physics simulations, non-player character AI and also possibly random processes, making the current state difficult to reproduce. Taking a snapshot at this point allows a game developer to explore alternative gameplay strategies, or review the circumstances required to produce a particular undesired (or desired) outcome.

Another example is a learning machine, such as a neural network, hidden Markov model or Bayesian machine that may receive live data feeds but be periodically snapshot when the outputs of the machine and/or the veracity of the inputs in a given period are confirmed. This allows machines to monitor live data (stock-market, weather or social media data, for example), but provides for aberrant data to be excised.

Other examples will be apparent to the skilled person.

Summary

Figure 5:
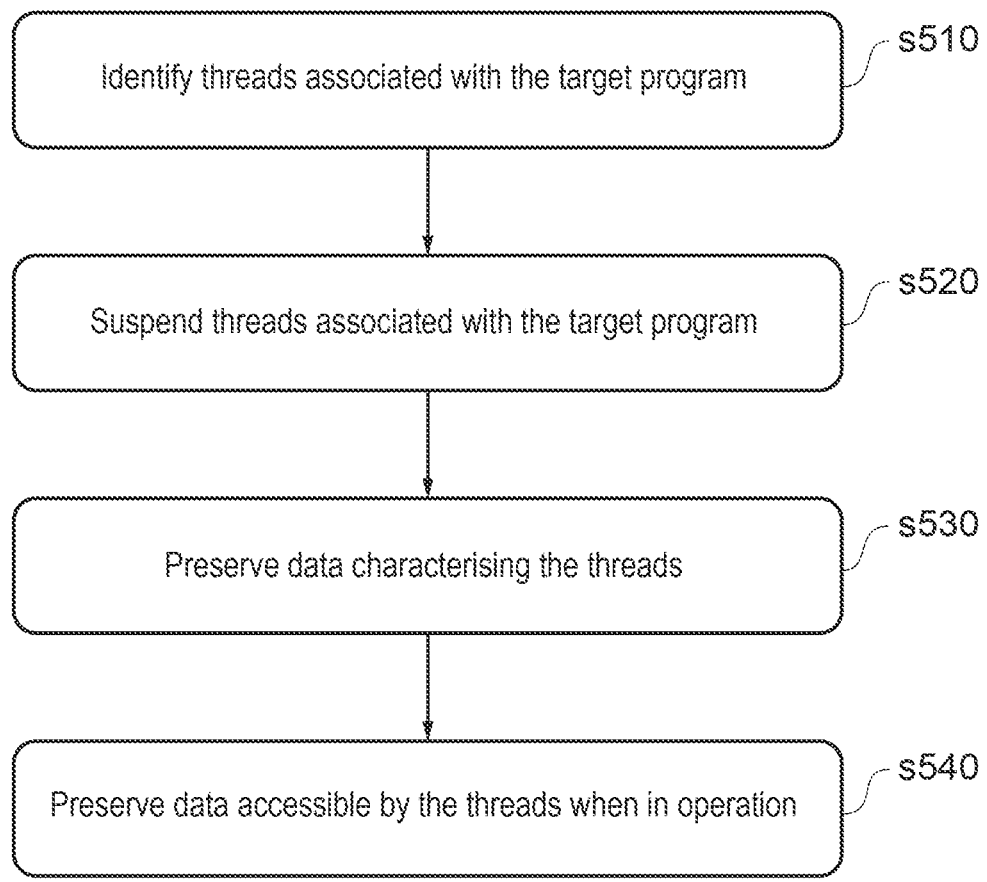
FIG. 5 is a flow diagram of a method of capture of a target process in accordance with an embodiment of the present invention.

Referring now to FIG. 5, in a summary embodiment of the present invention, as described previously herein a method of capturing the state of a target program that is running within the environment of an OS comprises:

In a first step s510, identifying threads associated with the target program;

In a second step s520, suspending threads associated with the target program (e.g. all those of or belonging to the target process);

In a third step s530, preserving data characterising the threads (such as registers, program counter and flags); and In a fourth step s540, preserving data accessible by the threads when in operation (such as contents of a VMA associated with the thread).

It will be appreciated that the method is carried out by the capture process (program), optionally in combination with the operating system (for example to identify threads in response to a request from the capture program). The third and fourth steps are described as 'preserving' data because data may either be physically copied to the VMA of the capture process, or the original data may be marked as 'copy on write' as described previously herein—following which, depending on the subsequent operations of the target process, it may not need to be copied at all unless the target process attempts to overwrite it. Hence in either case the code is preserved but may not necessarily be copied.

In an instance of this summary embodiment, as described previously herein the method comprises the steps of detecting whether a thread has been suspended in a protected mode (e.g. due to a call to a first function implemented in the protected mode), and replacing an instruction immediately after the call to the first function in the suspended thread with a breakpoint, the breakpoint operating outside the protected mode. The thread can then be released and allowed it to run until it reaches the break point and is re-suspended; the replaced instruction is then restored in the suspended thread, before the various data is preserved as before.

In this case, for situations where the first function may remain in protected mode indefinitely, then as described previously herein the method may comprise substituting the first function implemented in the protected mode with a function that in turn is operable to implement a loop outside the protected mode, and from within the loop call the first function to operate for a limited period of time.

In an instance of this summary embodiment, as described previously herein the method comprises the steps of creating a thread pool, trapping thread-create commands relating to the target program and instead supplying a thread from the thread-pool, and trapping thread-destroy commands relating to the target program and instead returning a thread to be destroyed to the thread pool; this ensures that threads with the same thread IDs can be obtained when the target program is re-wound, as explained previously.

In an instance of this summary embodiment, as described previously herein the method comprises the steps of intercepting communications between a thread associated with the target program and a graphics application programming interface (such as Direct3D), and recording identifiers associated with graphics resources stored in a video ram used by a graphics processor.

In an instance of this summary embodiment, as described previously herein the method comprises the steps of duplicating content from a video ram used by a graphics processor to a virtual memory area created in association with the target program; and then preserving the content.

In an instance of this summary embodiment, as described previously herein the step of preserving data accessible by the threads when in operation in turn comprises the steps of creating a virtual memory area associated with a capturing program (i.e. the capture process 210), the created virtual memory area having similar properties to the virtual memory area to be preserved, pointing the created virtual memory area at the same physical memory as the virtual memory area to be preserved, and setting the virtual memory area to be preserved as copy-on-write memory.

Figure 6:
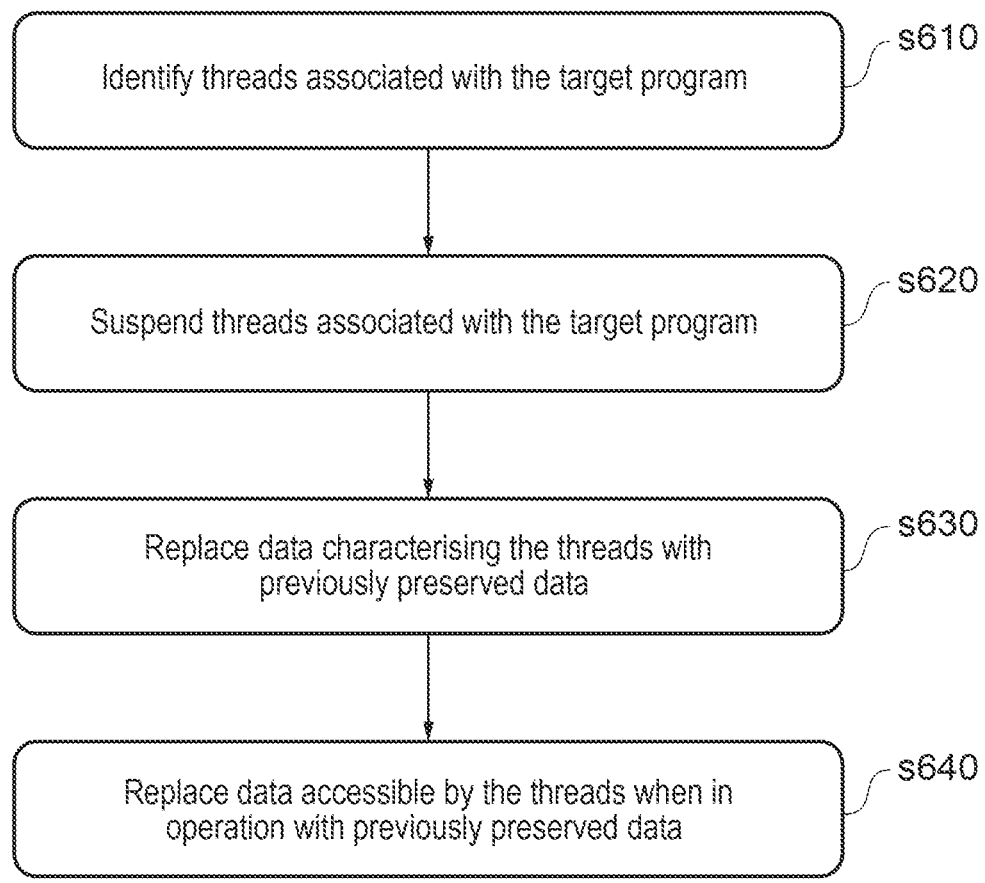
FIG. 6 is flow diagram of a method of change or 'rewind' of a target process in accordance with an embodiment of the present invention.

Referring now to FIG. 6, in a summary embodiment of the present invention, as described previously herein a method of a method of changing ('rewinding') the state of a target program that is running within the environment of an OS comprises:

In a first step s610, identifying threads associated with the target program;
In a second step s620, suspending threads associated with the target program (e.g. all those of or belonging to the target process);
In a third step s630, replacing data characterising the threads with previously preserved data (such as registers, program counter and flags); and
In a fourth step s640, replacing data accessible by the threads when in operation with previously preserved data (such as contents of a VMA associated with the thread).

In an instance of this summary embodiment, as described previously herein any replaced or restored semaphore or mutex is locked, signalled or released as appropriate until its state matches its state when preserved.

In a summary embodiment of the present invention, as described previously herein, after either capturing or rewinding the state of a target program, all suspended threads are resumed.

In an instance of this summary embodiment, as described previously herein the method comprises the steps of duplicating preserved content to a video ram used by a graphics processor, intercepting communications between a thread associated with the target program and a graphics application programming interface, detecting new identifiers associated with graphics resources stored in a video ram used by a graphics processor, and translating between recorded identifiers used by the target program and new identifiers used by the graphics application programming interface that correspond to the same graphics resources.

In a summary embodiment of the present invention, a computing apparatus comprises processing means operable to run an operating system and programs running within the environment of that operating system, and memory means operable to store data related to said programs, and is configured to identify threads associated with a target program, suspend threads associated with the target program, preserve data characterising the threads, and preserve data accessible by the threads when in operation.

In a summary embodiment of the present invention, a computing apparatus comprises processing means operable to run an operating system and programs running within the environment of that operating system, and memory means operable to store data related to said programs, and is configured to identify threads associated with a target program, suspend threads associated with the target program, replace data characterising the threads with previously preserved data, and replace data accessible by the threads when in operation with previously preserved data.

In either case, the apparatus may then resume all suspended threads.

It will be appreciated that the above methods may be carried by suitably configuring conventional hardware by software instruction. As described herein, the software is a capture program (process), in conjunction with the operating system and a graphics API as required. The capture program itself may in turn comprise separate processes, such as a capture process, a trapping process for system calls, an intercept process for communication between the target program and the graphics API, and optionally a separate rewind process. It will be appreciated that the or each process is started at an appropriate time with respect to the target process. For example, the intercept process, or the part of the capture process that implements API intercepts, may be started immediately prior to the target process itself.

The above described software may also be implemented in conventional hardware by the inclusion or substitution of dedicated hardware operable to implement equivalent functionality.

Thus the required adaptation to existing parts of a conventional equivalent device may be implemented in the form of a computer program product comprising processor implementable instructions stored on a tangible non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these of other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of capturing a state of a target program that is running within an environment of an operating system, comprising the steps of:
   identifying, by one or more processors, threads associated with the target program;
   suspending, by the one or more processors, threads associated with the target program;
   preserving, by the one or more processors, data characterising the threads;
   preserving, by the one or more processors, data accessible by the threads when in operation;
   detecting whether a thread has been suspended in a kernel mode due to a call to a first function implemented in the kernel mode;
   replacing an instruction immediately after the call to the first function in the suspended thread with a breakpoint, the breakpoint operating outside the kernel mode; and
   substituting the first function implemented in the kernel mode with a function that in turn is operable to implement a loop outside the kernel mode, and from within the loop call the first function to operate for a limited period of time.

2. A method according to claim 1, comprising the steps of:
   releasing the thread and allowing the thread to run until the thread reaches the break point and is re-suspended; and
   restoring the replaced instruction in the suspended thread.

3. A method according to claim 1, comprising the steps of:
   creating a thread pool;
   trapping thread-create commands relating to the target program and instead supplying a thread from the thread-pool, and
   trapping thread-destroy commands relating to the target program and instead returning a thread to be destroyed to the thread pool.

4. A method according to claim 1, comprising the steps of:
   duplicating content from a video ram used by a graphics processor to a virtual memory area created in association with the target program; and
   preserving the content.

5. A method according to claim 1, wherein the step of preserving data accessible by the threads when in operation in turn comprises the steps of:
   creating a virtual memory area associated with a capturing program, the created virtual memory area having similar properties to the virtual memory area to be preserved;
   pointing the created virtual memory area at a same physical memory as the virtual memory area to be preserved; and
   setting the virtual memory area to be preserved as copy-on-write memory.

6. A method according to claim 1, comprising the steps of:
   resuming all suspended threads;
   duplicating preserved content to a video ram used by a graphics processor;
   detecting new identifiers associated with graphics resources stored in the video ram used by the graphics processor; and
   translating between the recorded identifiers used by the target program and the new identifiers used by the graphics application programming interface that correspond to the same graphics resources.

7. A non-transitory computer-readable storage medium storing computer instructions thereon, the computer instructions, when executed by a processor, cause the processor to carry out a method of capturing a state of a target program that is running within an environment of an operating system, the method comprising:
   identifying threads associated with the target program;
   suspending threads associated with the target program;
   preserving data characterising the threads;
   preserving data accessible by the threads when in operation;
   detecting whether a thread has been suspended in a kernel mode due to a call to a first function implemented in the kernel mode;
   replacing an instruction immediately after the call to the first function in the suspended thread with a breakpoint, the breakpoint operating outside the kernel mode; and
   substituting the first function implemented in the kernel mode with a function that in turn is operable to implement a loop outside the kernel mode, and from within the loop call the first function to operate for a limited period of time.

8. A computing apparatus for capturing a state of a target program that is running within an environment of an operating system, comprising:
   one or more processing devices configured to run the operating system and programs running within the environment of the operating system; and
   memory configured to store data related to said programs;
   and in which the apparatus is configured to:
   identify threads associated with a target program;
   suspend threads associated with the target program;
   preserve data characterising the threads;
   preserve data accessible by the threads when in operation;
   detect whether a thread has been suspended in a kernel mode due to a call to a first function implemented in the kernel mode;
   replace an instruction immediately after the call to the first function in the suspended thread with a breakpoint, the breakpoint operating outside the kernel mode; and
   substitute the first function implemented in the kernel mode with a function that in turn is operable to implement a loop outside the kernel mode, and from within the loop call the first function to operate for a limited period of time.

9. A computing apparatus according to claim 8, in which the apparatus is configured to:
- resume all suspended threads;
- duplicate preserved content to a video ram used by a graphics processor;
- detect new identifiers associated with graphics resources stored in the video ram used by the graphics processor; and
- translate between the recorded identifiers used by the target program and the new identifiers used by the graphics application programming interface that correspond to the same graphics resources.

* * * * *